United States Patent
McCarthy et al.

(10) Patent No.: US 6,725,224 B1
(45) Date of Patent: Apr. 20, 2004

(54) CONTROLLER SYSTEM FOR INTERFACING WITH A WORK FLOW MANAGEMENT SYSTEM

(75) Inventors: Cormac McCarthy, CountyWicklow (IE); John Feighan, Dublin (IE); Paula Kelly, Dublin (IE)

(73) Assignee: Phoenix Technology Patent Development Limited, Dublin (IE)

( * ) Notice: Subject to any disclaimer, the term of this patent is extended or adjusted under 35 U.S.C. 154(b) by 0 days.

(21) Appl. No.: 09/572,235

(22) Filed: May 17, 2000

(30) Foreign Application Priority Data

Jun. 30, 1999 (IE) .................................................. 990547

(51) Int. Cl.$^7$ ............................................. G06F 17/30
(52) U.S. Cl. ........................... 707/101; 700/101; 705/8; 715/514
(58) Field of Search ..................... 707/1, 9, 10, 104, 707/201, 203, 101; 715/514; 705/8, 33; 700/101

(56) References Cited

U.S. PATENT DOCUMENTS

| | | | | |
|---|---|---|---|---|
| 4,503,499 A | * | 3/1985 | Mason et al. ............... | 709/101 |
| 5,535,322 A | * | 7/1996 | Hecht ........................... | 705/1 |
| 5,799,297 A | | 8/1998 | Goodridge et al. ........... | 707/1 |
| 5,848,393 A | | 12/1998 | Goodridge et al. ........... | 705/8 |
| 5,870,545 A | | 2/1999 | Davis et al. ............... | 395/200 |
| 5,999,911 A | * | 12/1999 | Berg et al. ...................... | 705/9 |
| 6,006,193 A | * | 12/1999 | Gibson et al. ................. | 705/8 |
| 6,023,572 A | * | 2/2000 | Lautzenheiser et al. ........ | 703/2 |
| 6,038,538 A | * | 3/2000 | Agrawal et al. ............ | 700/150 |
| 6,067,548 A | * | 5/2000 | Cheng .................... | 707/103 R |
| 6,073,109 A | * | 6/2000 | Flores et al. ................... | 705/8 |
| 6,088,679 A | * | 7/2000 | Barkley ......................... | 705/8 |
| 6,101,481 A | * | 8/2000 | Miller ............................ | 705/9 |
| 6,144,955 A | * | 11/2000 | Tsuiki et al. .................. | 705/26 |
| 6,151,583 A | * | 11/2000 | Ohmura et al. ................. | 705/8 |
| 6,279,009 B1 | * | 8/2001 | Smirnov et al. ......... | 707/103 R |
| 6,308,224 B1 | * | 10/2001 | Leymann et al. ........... | 709/202 |
| 6,311,192 B1 | * | 10/2001 | Rosenthal et al. ............ | 705/38 |
| 6,445,968 B1 | * | 9/2002 | Jalla .......................... | 700/101 |

FOREIGN PATENT DOCUMENTS

WO     WO99/05632     2/1999

* cited by examiner

*Primary Examiner*—Jean R. Homere
(74) *Attorney, Agent, or Firm*—Jacobson Holman PLLC (57) ABSTRACT

A work flow system (15) comprises a controller (20) and a work flow processor (40). An indexing user interface (21) and a work flow processing user interface (22) interact with work flow processor interface components (23). An administration setup user interface (25) and an integration setup user interface (26) are linked to setup components (27) which generate and access a reference database (28) and a transaction database (29). The reference database (28) stores an organization model and a process model and an interface (23) controls the work flow processor (4) according to these models.

13 Claims, 7 Drawing Sheets

CONTROLLER SYSTEM FOR INTERFACING WITH A WORK FLOW MANAGEMENT SYSTEM

FIELD OF THE INVENTION

The invention relates to a work flow management system and to a method for developing such a system.

PRIOR ART DISCUSSION

A good deal of work has been carried out in recent years in this field. In such systems, documents are typically captured as images and are stored using optical disk cartridge storage and retrieval mechanisms. The work flow processing is typically carried out by distributed hardware and software, which is often in a client/server configuration. The object is to provide "paperless" office work flow control in which users are assisted with the tasks they need to perform and allocation of tasks is controlled. The "paperless" aspect is achieved by image document management.

The work to date in this field has generally provided effective engines or modules for particular tasks for work flow processing. For example U.S. Pat. No. 5,870,545 (Hewlett Packard) describes a system which is effective at compensating for failed process activities. U.S. Pat. No. 5,848,393 (NCR) describes a system in which a simulator is coupled to a rule editor for simulating execution of rules before live application. U.S. Pat. No. 5,799,297 (NCR) describes a system in which a rule evaluator evaluates current and subsequent clauses in rules. U.S. Pat. No. 5,535,322 (IBM) describes a method of assigning a unique identifier to incoming submissions. A repository has an attribute-based file system for WIP submission attributes and contents.

WO 9905632 (Filenet) describes an object-oriented approach for catering for widely distributed work flow control. Filenet Corp. also provides a work item queuing engine which is marketed under the name VISUAL WORK-FLO™. This mechanism is effective at providing queuing of work flow items according to business organization processes.

While these developments represent major strides in performance of work flow management tasks, there still remains considerable difficulty in linking the systems to business organizations. This task tends to be labour-intensive and error-prone, requiring a good deal of bespoke-type software development. This in turn leads to problems in maintenance of the work flow management system both to cater for organization process changes and also upgrades to the system as they are developed.

Thus, in summary, the existing systems provide:
- a work flow processor comprising means for performing image document management and work item queuing, and
- a controller comprising means for linking the work flow processor to the business organization and controlling it accordingly, in which the controller is difficult and time-consuming to develop and to maintain.

OBJECTS OF THE INVENTION

Thus, the present invention is directed towards providing a work flow management system is which the controller links the work flow processor to the business organisation in a more structured manner for simpler and more business-orientated development and on-going maintenance.

SUMMARY OF THE INVENTION

According to the invention, there is provided a controller for a work flow processor comprising means for performing image document management and work item queuing, the controller comprising means for linking the work flow processor with an organization and controlling it accordingly, characterised in that, the controller comprises:
- a reference database,
- a database set-up means comprising means for generating in the reference database an organization model and a process model under user instructions, and
- a work flow processor interface comprising means for controlling the work flow processor according to the models of the reference database.

In one embodiment, the organization model relates accountability and member types to accountability and member instances.

Preferably, the process model relates process definitions to process steps.

In another embodiment, the organization and process models are linked by data records relating organization member data with process step data.

Preferably, the reference database links the organization model to the process model by relating members to trays, each of which is associated with a work item queue.

Preferably, work items are defined in the reference database by expressions defining phenomena for phenomenon types, said expressions relating queue to process step data.

In another embodiment, the database set-up means comprises set-up components controlled by an administration set-up user interface for generating the organization model, and an integration set-up user interface for generating the process model.

Preferably, the set-up components comprise means for allowing on-the-fly model modification under user instructions to cater in a simple manner for organization and process modification.

In a further embodiment, the transaction database comprises a structure for storing process status data related to processes and work items.

Preferably, the transaction database comprises a structure for storing audit history data and comment text.

In another embodiment, the work flow processor interface comprises components activated by a scanning/indexing user interface and a work flow processing user interface, the components comprising means for performing work flow control and browse/fetch operations with reference to the reference database to interrogate the work flow processor.

In a further embodiment, work flow processor interface components comprise means for automatically updating the transaction database in real time.

In another embodiment, work flow processor interface components comprise means for performing find/view operations requested by users with reference to the transaction database.

In a further embodiment, the work flow processor interface components are called by user interface views using polymorphic objects which facilitate re-use of code.

Preferably, each work item is represented by an object which is mapped to the reference database by association with a relational table row.

In another embodiment, the components are presented to the user interface and work flow processor environments by platform-dependent component wrappers.

BRIEF DESCRIPTION OF THE DRAWINGS

The invention will be more clearly understood from the following description of some embodiments thereof given by way of example only with reference to the accompanying drawings in which.

DESCRIPTION OF THE INVENTION

Figure 1:
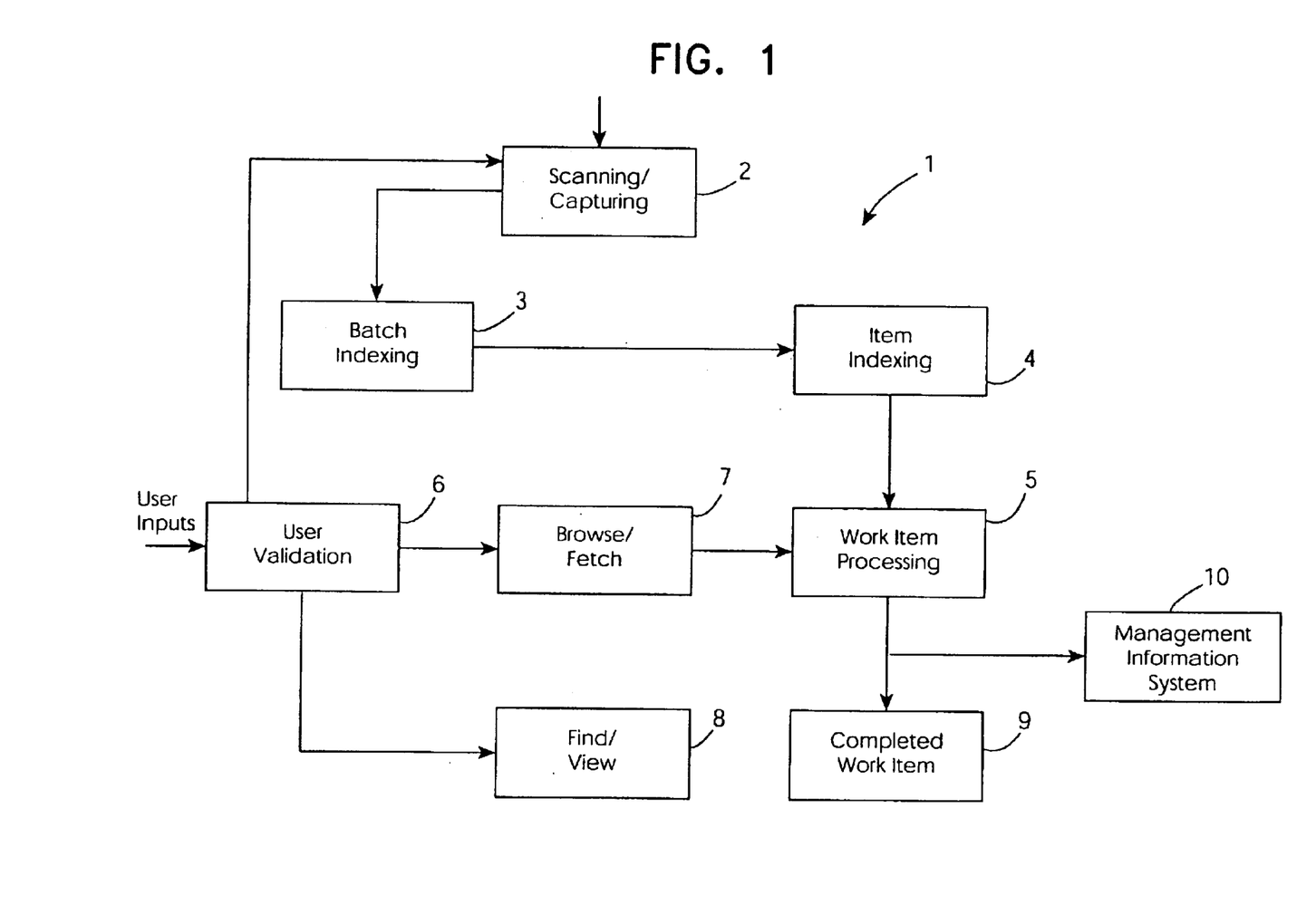
FIG. 1 is a flow diagram illustrating work flow in a business organisation.

Referring to FIG. 1, work flow in a business organization such as an insurance company or a financial institution is indicated generally by the numeral 1. In a step 2 documents in paper or electronic form are scanned or captured as appropriate.

Other important functions are batch indexing in step 3, and subsequently individual items are indexed in step 4.

In step 5, there is work item processing involving queuing of items according to inter alia users, user roles, business functions, and received instructions and queries.

There is a lateral flow from a step 6 in which user inputs are validated to control the access of the users to the system. The major functions carried out by the user are control of scanning/capturing and batch indexing. Other important functions are browse/fetch functions 7 in which there is access to a service database with modification of data, and find/view functions 8 in which users such as tele-sales operators retrieve information in response to queries.

The browse/fetch functions 7 result in work item processing, which in turn leads to output of completed work items in step 9 and capture of data to a management information system in step 10.

Figure 2:
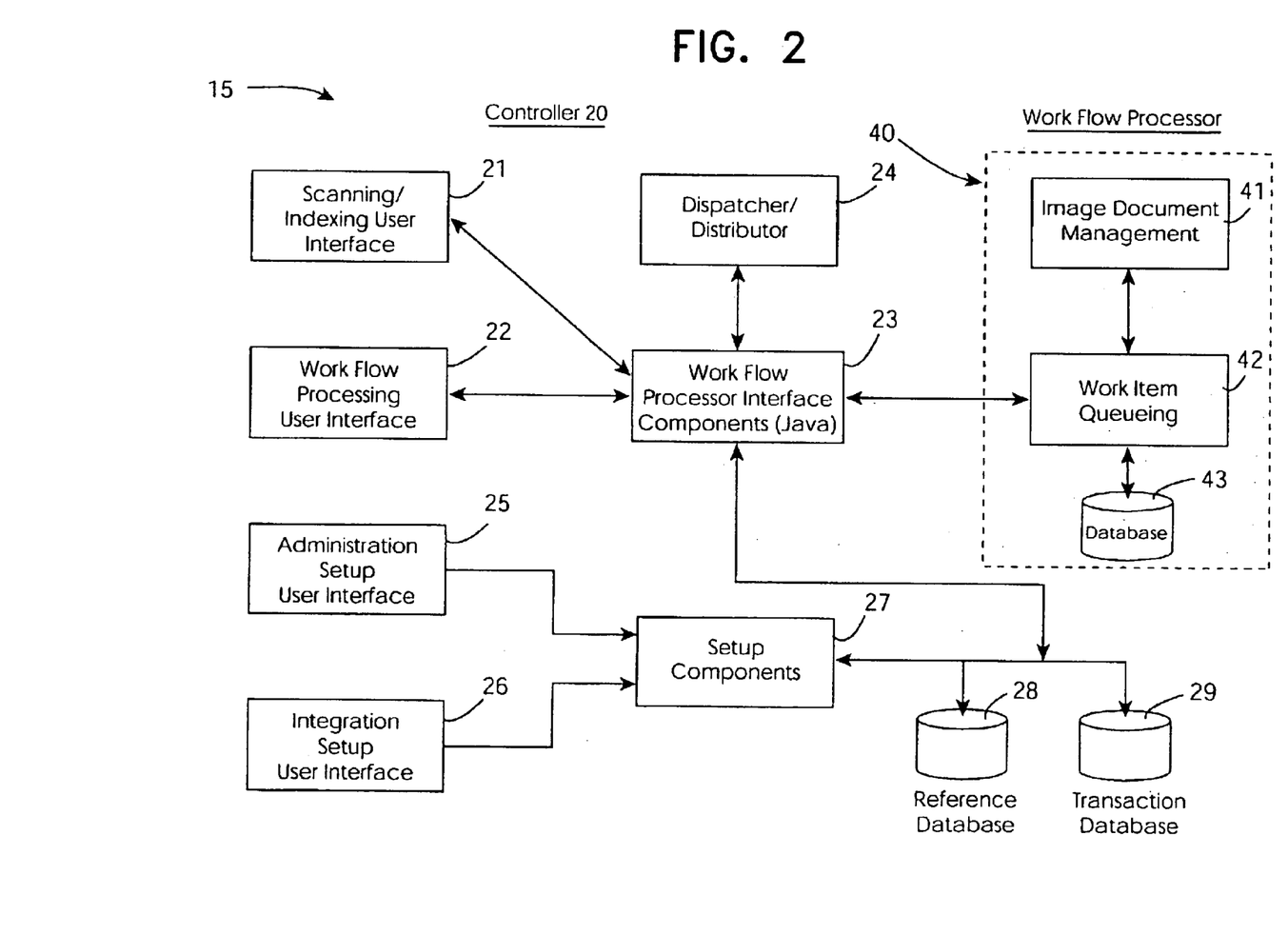
FIG. 2 is a block diagram illustrating a work flow management system of the invention for controlling the work flow of FIG. 1.

The system 15 comprises a controller 20 and a work flow processor 40. The latter comprises an image document management function 41, a work item queuing function 42, and a database 43. The work flow processor 40 is conventional and may, for example, comprise components supplied by FileNET Corp. under the Trade Mark PANAGON™.

The invention provides the controller 20 which links the work flow processor 40 to a business organization in a simple and structured manner. This reduces cost and time for system configuration and for ongoing maintenance.

The controller 20 comprises an indexing user interface 21 and work flow processing user interface 22, both of which interact with work flow processor interface components 23. These components are developed in the JAVA™ language and interact directly with the work flow processor 40. The components 23 also interact with a dispatcher/distributor 24.

The controller 20 also comprises an administration set-up user interface 25, and an integration set-up user interface 26, both of which are linked to VISUAL BASIC™ set-up components 27. The set-up components 27 generate and access a reference database 28 and a transaction database 29. The work flow processor interface components 23 also access the databases 28 and 29.

The work flow processor 40 performs document capture and routing/queuing operations. The controller 20 links the work flow processor 40 with the particular business organization.

The system 15 performs the required functions for the work flow 1 illustrated in FIG. 1 broadly as follows:

| | |
|---|---|
| Scanning/capturing 2: | A scanning interface, an image processor, and an image database which are all part of the block 41. |
| Batch indexing 3: | Indexing components 23 receiving user instructions from the UI 21 and controlling indexing resources in the block 41. |
| Item indexing 4: | The indexing components 23 referred to above. They split a batch into items which are transferred to the block 42 under control of the dispatcher 24. |
| Work item processing 5: | Work item components receiving user instructions from the UI 22 and controlling the block 42. |
| User validation 6: | User validation components 23 which are activated by all UIs 21, 22, 25, and 26. |
| Browse/fetch 7: | Browse/fetch components 23 interfacing with the UI 22 and using the databases 28 and 29. |
| Find/view 8: | Browse/fetch components 23 which are configured to perform find and view operations only according to the organisation model in the reference database 28. These components access only the transaction database 29 for data, not the work flow processor 40. |
| Completed Work Item: | A background completion process in the block 42 calls a completion component 23. |
| MIS 10: | Database procedures in the reference database 28 and in the transaction database 29. |

The block 23 comprises a JAVA™ environment of packages which are used by the user interfaces 21, 22, 25, 26. The user interfaces call different views of the JAVA™ environment using polymorphic objects which facilities re-use of code within the environment. The databases 28 and 29 have a structure which is mapped to the JAVA™ object environment. For example, for each work item object there is a row in a work item table. The components 23 present themselves to the user interface environment through platform-dependent component wrappers. There is a different set of component wrappers for interfacing with the work flow process 40.

The components 27 are developed in VB™ and the following is an example of code for a component which "clones" a path and a process.

VB Code (ClonePath and CloneProcess)

```
Public Sub ClonePath()
Dim objPath As Path
Dim lClonePathID As Long
On Error GoTo errHandler:
FunctionCode = "107"
Screen.MousePointer = vbHourglass
'// Set up control for new path
mPurpose = ucNEWPATH
'// OK button
Call mOKButton
'// Get the parent process from the database
Set mobjProcess = mcolProcesses(tvProcesses.SelectedItem.Parent.Key)
lClonePathID = Val(Mid$(tvProcesses.SelectedItem.Key, 4))
Set mobjPath = mobjProcessFactory.GetPath(lClonePathID)
mLoadControl mobjProcess
mConfigurePath
txtProcessName.Text = ""
Screen.MousePointer = vbDefault
Exit Sub
errHandler:
RaiseEvent ErrorOccurred(Err.Number, "",
sPassOnErrorDescription(ComponentCode, FunctionCode, StepCode,
Err.Description))
End Sub
Public Sub CloneProcess()
Dim lProcessID As Long
On Error GoTo errHandler:
FunctionCode = "102"
Screen.MousePointer = vbHourglass
```

-continued

```
'// Set up control for clone process
mPurpose = ucCLONEPROCESS
'// OK button
Call mOKButton
'// Get the collection key
lProcessID = Val(Mid$(tvProcesses.SelectedItem.Key, 4))
'// Get a copy of the clone process from the database
Set mobjProcess = mobjProcessFactory.GetProcess(lProcessID)
mLoadControl mobjProcess
txtProcessName.Text = ""
Screen.MousePointer = vbDefault
Exit Sub
errHandler:
RaiseEvent ErrorOccurred(Err.Number, "",
sPassOnErrorDescription(ComponentCode, FunctionCode, StepCode,
Err.Description))
End Sub
```

The components 23, under user instructions from the user interface 22 maintain the transaction database 29. This is a simple set of tables, initialised to hold data relating to such things as audit trails and comments. In more detail, the transaction database 29 stores data in relational table structures. The data includes the following:

Indexing fields used to route a work item to a correct address initially.

Audit history of all past transactions for each work item.

Comments linked with the audit data, as inputted by the users.

Process status information setting out the current process step for the work items.

The transaction database 29 therefore includes all data which is required for a find/view operation 8. The components 8 only need to access the transaction database 29 for such an operation. The transaction database 29 includes a database procedure which autonomously performs MIS operations.

The reference database 28 has a relational table structure. This structure defines organization and process models which are created by the set-up components 27 and are subsequently maintained by these components to cater for business organization changes. The organization and process models are used by the components 23 to interface with the work flow processor 40.

The structure of the reference database 28 is very important. It defines the manner in which the work flow is controlled for the particular business organization.

The set-up components 27 under instructions via the administration user interface 25 set up the organization model. This comprises relational tables for each of:

organization members, member types, accountability, and accountability types.

There is a one-to-many relationship between records in each of the member and accountability type tables and records in the member and accountability tables respectively.

The organization model also includes "tray" tables defining "trays" which link members to work flow processing generally. The tray is analagous to a manual or physical member work in-tray. The tray table is in turn related to a filter table.

Figure 3:
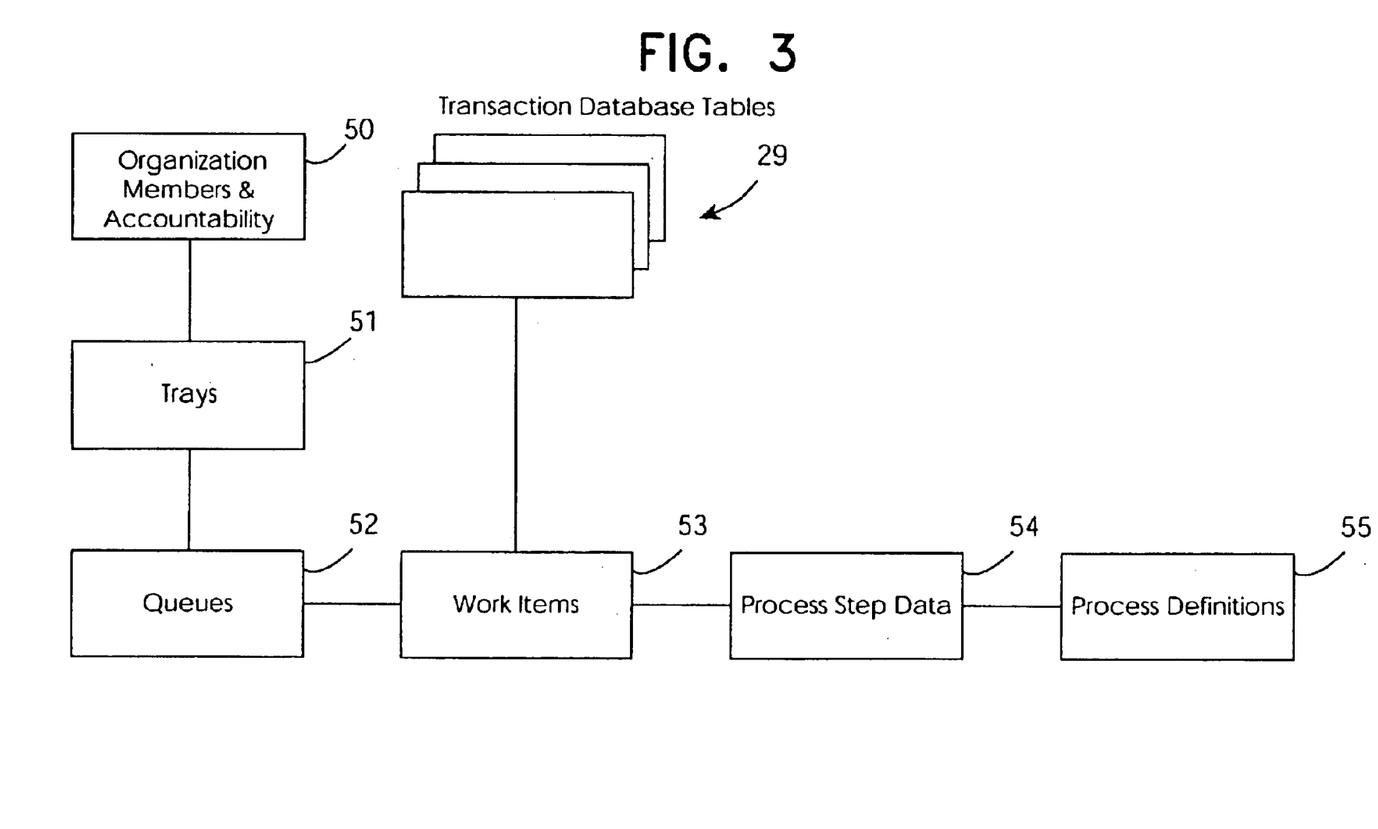
FIGS. 3 and 4 are diagrams illustrating work flow control structures.

Referring to FIG. 3 the organization model links each member 50 with a set of associates trays 51. Also, each tray 51 is associated with a work item queue 52. Each queue 52 contains work items 53.

The tables defining the queues 52 and the work items 53 are a bridge between the organization and process models. The tables include expressions for phenomena and phenomenon types. For examples the following is a simple expression:

Region=West (N, S, E, W)

In this expression, "Region" is a phenomenon type and "West" is a phenomenon. Expressions and phenomena are used to define the organization. In the sample above, for example, the expression is used to define a geographical organization structure. The structure is completed by relationships between the member and accountability tables and phenomena and expression tables. These relationships are established in a simple and user-friendly manner using the administration user interface 25.

Referring again to FIG. 3, the process model comprises process step data tables 54 and process definition tables 55. The process definition tables 55 include process and process path tables. The step data tables 54 include step type, transition and transition type tables.

The process model tables are generated via the integration user interface 26. This user interface allows a user to integrate process definitions to the organization model generated by the administration user interface 25. This is achieved by linking the process model tables 54 and 55 to the "bridging" tables 52 and 53. Integration is completed, as shown in FIG. 3, by relating the transaction database tables 29 with the work item tables 53.

Figure 4:
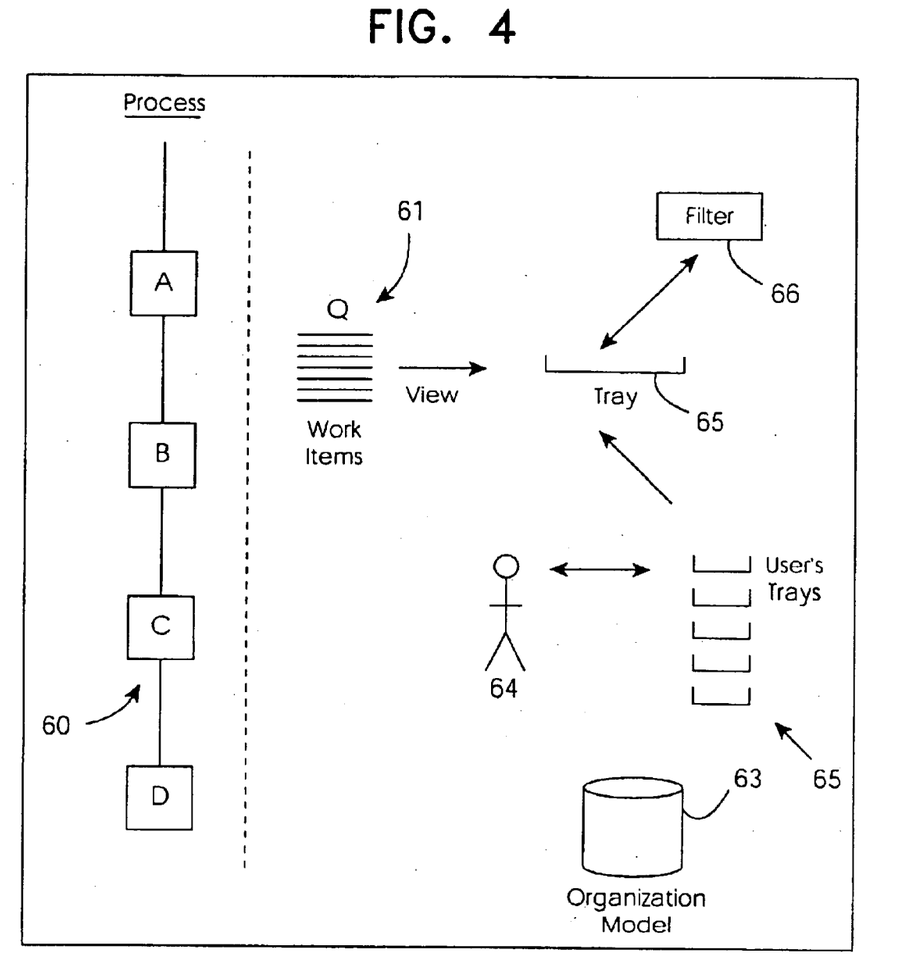

Referring now to FIG. 4, the components 23 use the databases 28 and 29 to interface with the work flow processor 40 according to business requirements. In the illustration of FIG. 4, a process 60 comprises a series of steps A, B, C, and D. The relationship between a particular process step and queues 61 is often complex and is defined by the reduction of a set of filter definitions by a queue name, by the dispatcher/distributor 24.

In the organization model (indicated by the numeral 63) a member 64 is associated with a set of trays 65. For a browse/fetch operation 7 a member selects one of his or her trays using the work flow processing interface 22. This interface under the control of the JAVA™ components 23, restricts the member access to only the associated set of trays 65.

The selected tray is associated in the references database 28 with a dedicated filter 66 and this filter is identified by the relevant JAVA™ component 23. The filter 65 provides a restricted view on the queue so that only particular work items may be accessed. The nature of the access is set by the administration user interface 25 when generating the organization model.

In operation, the work flow processor 40 controls image document management and queuing functions under control of the controller 20. Some of the operations require little input from the controller, such as automatic capture of image, fax, e-mail, voice and telephone message/document objects. The indexing user interface 21 of the controller controls indexing by setting values for indexing types. These are relevant to the structure of the organization.

The JAVA™ components 23 control work distribution under instructions received from the user interface 22 and using the databases 28 and 29.

In most applications, work is usually created either by a telephone call or as a result of incoming correspondence by post, fax, or email. Incoming correspondence is scanned in batches into the work flow processor 40. Documents are routed for either partial or full indexing. This indexing task can be performed either within the scan area or within the appropriate business department (or both). The documents are indexed by key criteria such as policy number and document type. Those documents that cannot be identified are marked as "Unidentified" and routed to an "Unidentified Post" queue.

Figure 5:
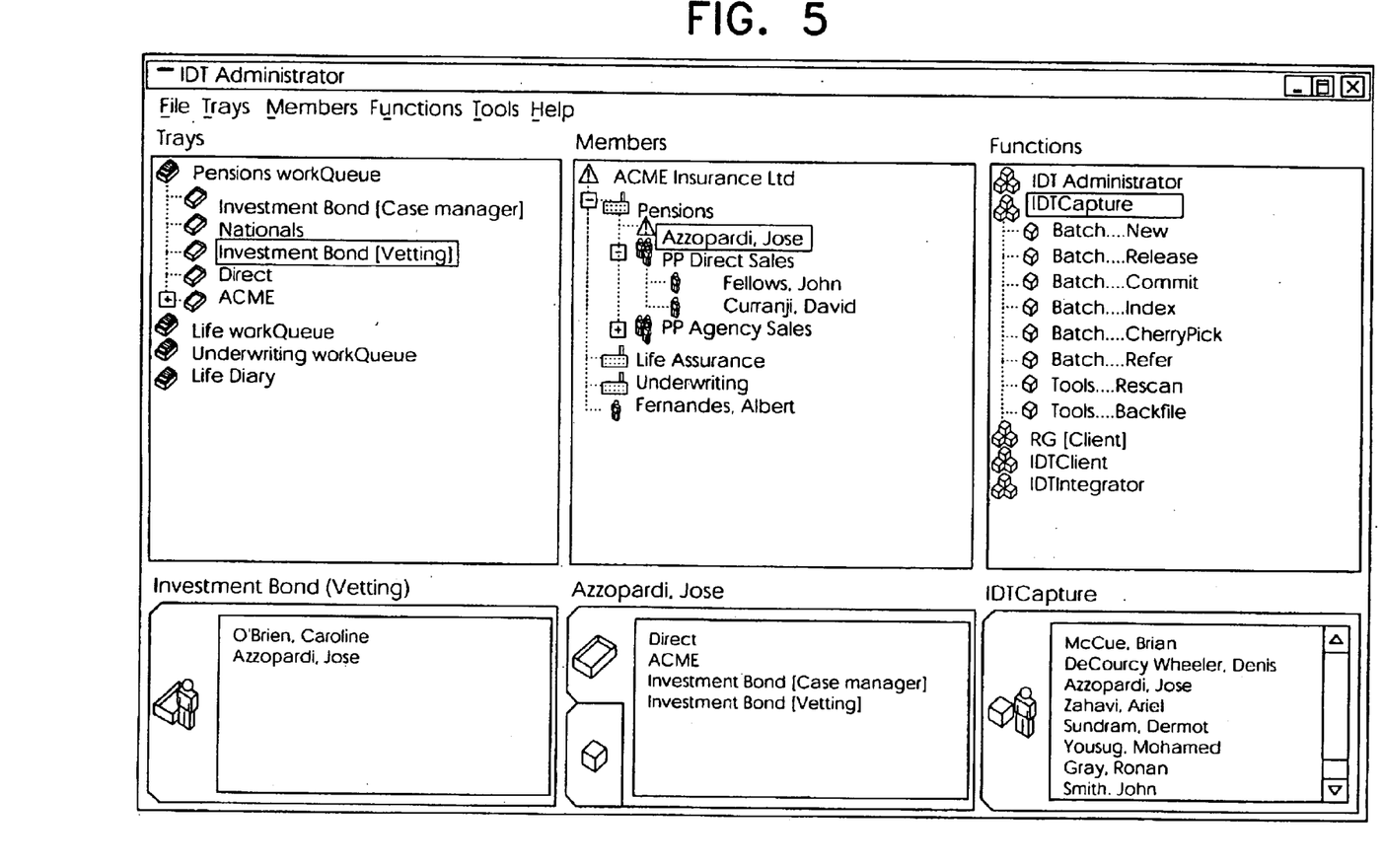
FIGS. 5 to 7 are sample screen shots.
Figure 6:
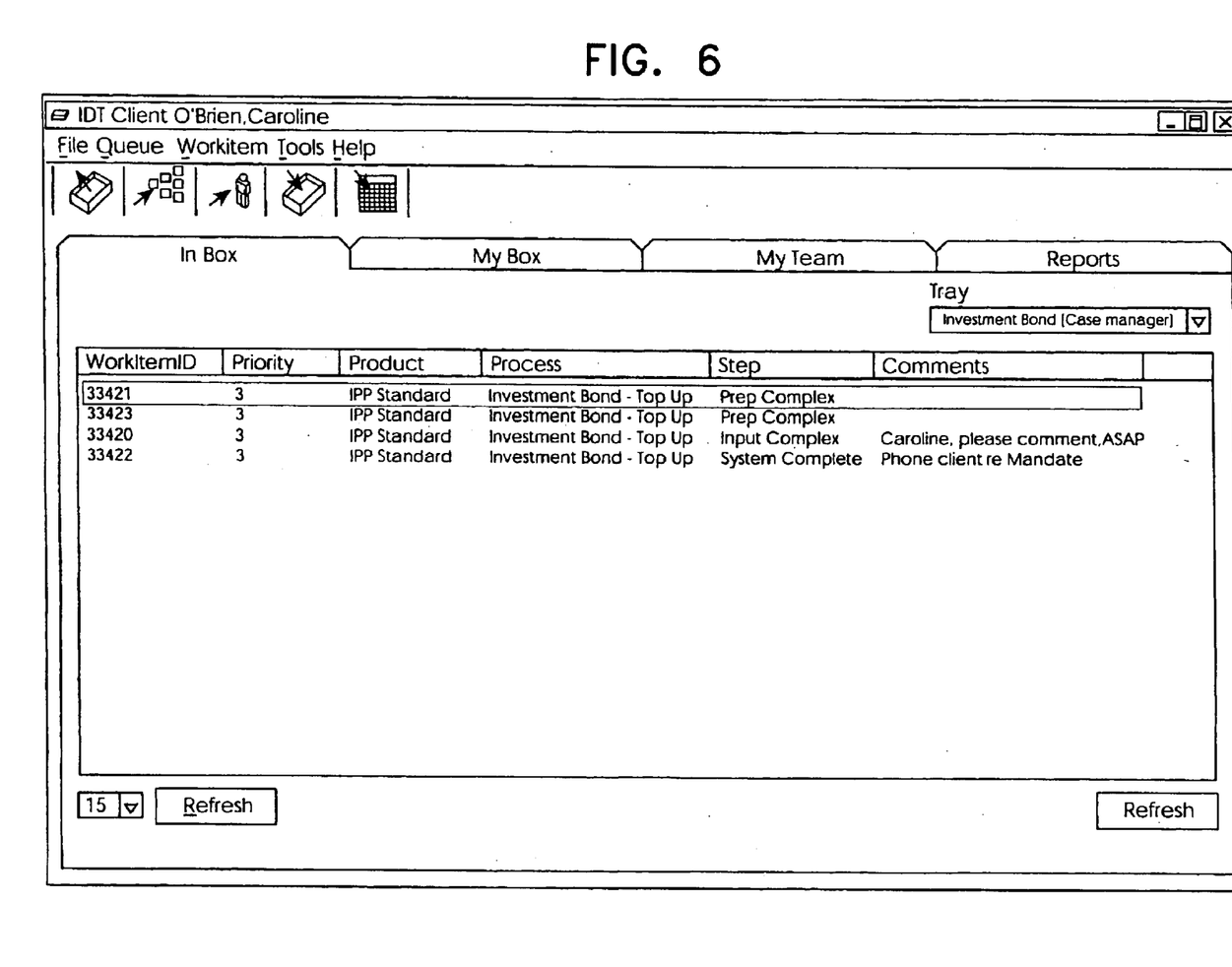
Figure 7:
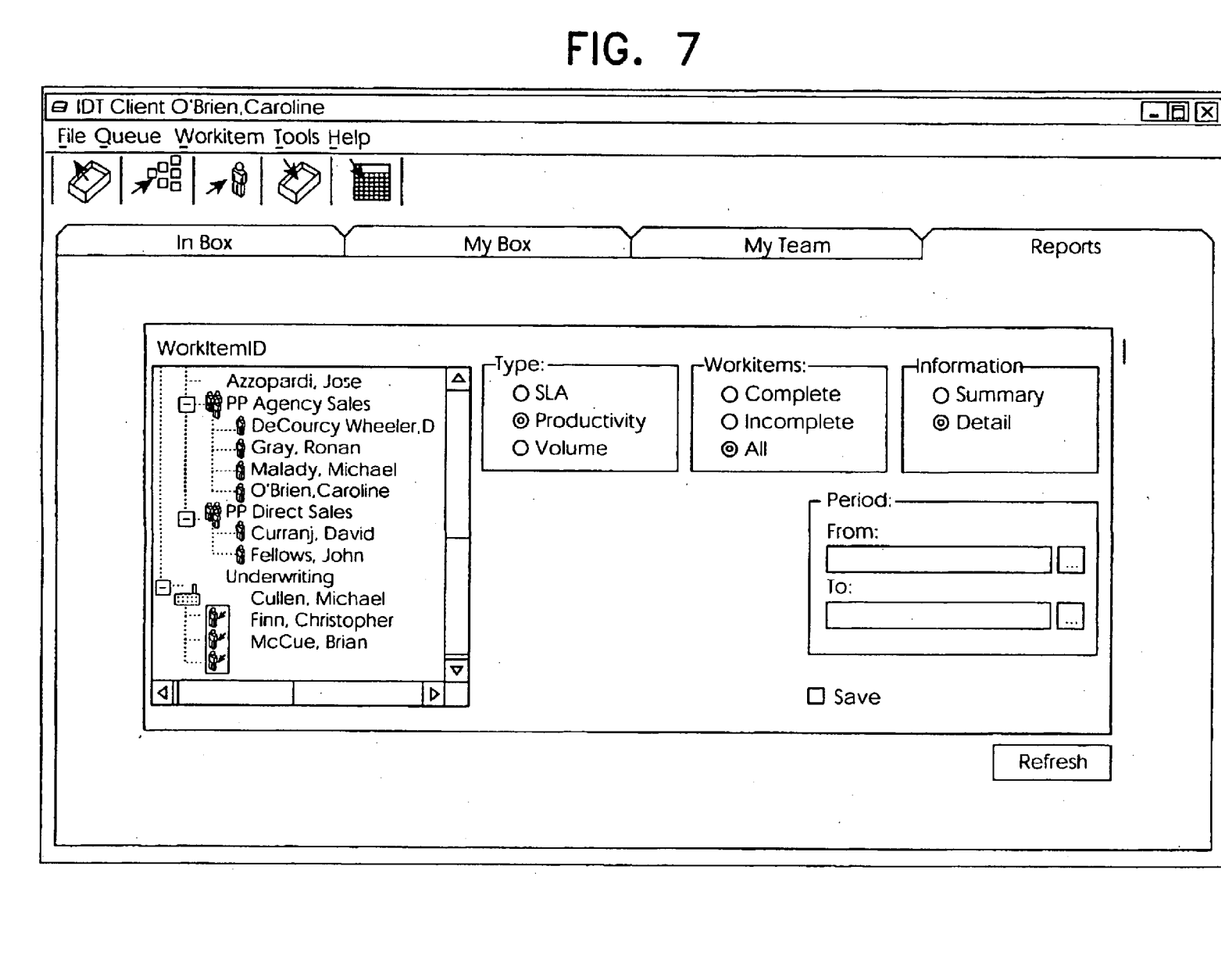

Work distribution components 23 process all indexed documents via work items, un-pend any existing work-items in the diary, and distribute the work-item to the appropriate user or team by referencing the alignment rules. These rules have been set up by the business manager and can be changed at any time using the user interface 25 or 26. An example of use of the user interface 25 is shown in the display screen of FIG. 5 named, "IDT Administrator". Also, the sample screen of FIG. 6 "IDT Client O'Brien, Caroline" illustrates the relationship between the database tables 52, 53, 54 and 55. The user can select work-items by task/work type (queue). Users may have access to browse the contents of queues, so that they can select work for processing or they may only be able to fetch the next highest priority work-item within the system. The table of FIG. 7 of the same name shows a display drawn from the member, queue, and tray tables.

When a work item has been retrieved from a work queue and its associated data and document images displayed. In many instances this requires the user to process a transaction. A work item, once fetched, can be routed for further processing in a number of ways. It can be re-routed to other user or teams for further processing or passed to a next step within the process. Alternatively, the work item can be placed in an electronic diary, perhaps after a letter has been sent. When a work-item has been placed into a diary, it is allocated a diary period specified by the user, during which time the work item is not available for processing. Pended work items are not reactivated unless either specifically requested or an incoming item of correspondence triggers re-activation of the work item. In this event, if the diary date expires or an item of correspondence re-activated the work item, the work item is returned to the originating queue prior to the work item being diarised.

Users are able to add a permanent note to a policy folder using a File Note component 23. When selected, this function will present the user with a form into which the user can key comments relating to the open work item. This form is stored permanently on file in the image document management system 41. An additional facility also exists for the user to add temporary comments, which are available for viewing only whilst the work item is "live" in the transaction database 29.

Users can Create work from the desktop. This functionality is typically required when work is requested via a telephone call as opposed to mail. The user enters key information associated with the new work item, the work item is created and automatically routed for processing.

For each of the above actions, an audit trail entry is automatically generated to provide tracking information for subsequent reporting purposes. All users are able to view the audit history of a work-item from the desktop.

The transaction database 29 is used by components 8 for satisfying all find/view requests. It also provides the Audit trail and tracking data. There is generally no need for the components 23 to access the reference database 28 for find/view operations, only browse/fetch operations.

The combination of the organization and process models provides a structure such as that below which defines user (member) roles.

Process Model

| Team A - NAC Pensions Aligned - Northern Region | | | Team C - Generalist | | |
|---|---|---|---|---|---|
| Product | Process | Task | Product | Process | Task |
| IPP | New Business (A) | Initial Check Initial UW U/W Quality Check | FB | New Business (without Life Cover) | Initial Check Quality Check |
| | Rewrite | Cancellation Initial Check Quality Check | | | |
| PTP | New Business | Initial Check TV Validation Quality Check | | | |

Organisation Model

| Users | | | Users | | |
|---|---|---|---|---|---|
| Name | Role | Step | Name | Role | Step |
| Paula | Team Leader | ALL | Richard | Team Leader | ALL |
| Brenda | Case Manager | Initial UW U/W Quality Check | Rob | Case Manager | Initial Check Quality Check |
| Steven | Case Manager | Initial Check | Philip | Case Manager | Initial Check Quality Check |

The member work item links defined by the reference database 28 are referred to as alignment rules. These rules define how work is distributed across members, such as according to region channel customer type etc. Also, each process step or task has a set of properties defined in its table and related tables. The step properties may, for example, include step SLA, and whether case ownership is required.

Case ownership determines when the same user who initiates the processing must process a work item through a certain set of steps. Also, the user interfaces 25 and 26 provide a set of control fields that enables customers to define their own additional specific task properties e.g. target task duration. These properties can be used for reporting purposes, i.e. to generate a report outlining the percentage of work completed within its target duration.

The controller 20 also allows a Manager or Team Leader to mark a user as absent. The manager can assign all of the user's work to another user or to the team. Once the absent user returns the Manager can mark him/her as "present" and work is routed to the user as before.

Other components 23 provide Team Leaders with an easy way of controlling the distribution of work within their team. The component displays the volume of work-items within each task/work-type queue, allowing bottlenecks to be quickly identified. Using a grid interface it shows which tasks each user is currently assigned. The team leader can balance work by assigning additional users to those tasks that have high volumes of work awaiting processing.

This system 15 also supports the concept of users in training. It allows the Team Leader to indicate when a user is being trained on a specific task and what percentage of their work should be checked by a more highly skilled user.

The invention is not limited to the embodiments described but may be varied in construction and detail within the scope of the claims.

What is claimed is:

1. A controller for a work flow processor comprising:

means for performing image document management and work item queueing, means for linking and controlling the work flow processor with an organization, a reference database, a reference database set-up means including means for generating under user instructions, in the reference database, an organization model including organization members, member types, accountability, accountability types, and trays linked with member types, and a process model for relating process steps to process definitions, a transaction database, a work flow processor interface including means for controlling the work flow processor according to the organization and process models of the reference database, and for updating the transaction database in real time with process status data, the organization and process models of the reference database are linked in the reference database by queues and work items, and the reference database work items are linked with the transaction database.

2. The controller as claimed in claim 1, wherein the organization model relates accountability and member types to accountability and member instances.

3. The controller as claimed in claim 2, wherein each tray is associated with a filter which provides a view on a queue.

4. The controller as claimed in claim 2, wherein the work items are defined in the reference database by expressions defining phenomena for phenomenon types, said expressions relating queue data to process step data.

5. The controller as claimed in claim 1, wherein the reference database set-up means comprises set-up components controlled by an administration set-up user interface for generating the organization model, and an integration set-up user interface for generating the process model.

6. The controller as claimed in claim 5, wherein the set-up components comprise means for allowing on-the-fly model modification under user instructions to cater in a simple manner for organization and process modification.

7. The controller as claimed in claim 6, wherein the transaction database comprises a structure for storing audit history data and comment text.

8. The controller as claimed in claim 1, wherein the work flow processor interface includes components activated by a scanning/indexing user interface and a work flow processing user interface, and the components including means for performing work flow control and browse/fetch operations with reference to the reference database to interrogate the work flow processor.

9. The controller as claimed in claim 1, wherein work flow processor interface components comprise means for performing find/view operations requested by users with reference to the transaction database.

10. The controller as claimed in claim 8, wherein the work flow processor interface components are called by user interface views using polymorphic objects which facilitate re-use of code.

11. The controller as claimed in claim 10, wherein each work item is represented by an object which is mapped to the reference database by association with a relational table row.

12. The controller as claimed in claim 10, wherein the components are presented to the user interface and work flow processor environments by platform-dependent component wrappers.

13. A work flow management system having a work flow processor including means for performing image document management and work item queueing, and a controller for linking the work flow processor with an organization, said controller comprising:

means for linking and controlling the work flow processor with an organization, a reference database, a reference database set-up means including means for generating under user instructions, in the reference database, an organization model including organization members, member types, accountability, accountability types, and trays linked with member types, and a process model relating process steps to process definitions, a transaction database, a work flow processor interface including means for controlling the work flow processor according to the organization and process models of the reference database, and for updating the transaction database in real time with process status data, the organization and process models of the reference database are linked in the reference database by queues and work items, and the reference database work items are linked with the transaction database.

* * * * *